(12) United States Patent  (10) Patent No.: US 8,202,145 B2
Isaman et al.  (45) Date of Patent: Jun. 19, 2012

(54) SERVICE TRUCK BODY PRESSURIZED STORAGE SYSTEM

(75) Inventors: Thomas E. Isaman, Ham Lake, MN (US); Matthew C. Lohafer, Lemars, IA (US); Kurtis L. Vos, Sioux Center, IA (US)

(73) Assignee: Maintainer Corporation of Iowa, Sheldon, IA (US)

( * ) Notice: Subject to any disclaimer, the term of this patent is extended or adjusted under 35 U.S.C. 154(b) by 615 days.

(21) Appl. No.: 12/383,235

(22) Filed: Mar. 20, 2009

(65) Prior Publication Data

US 2010/0240293 A1 Sep. 23, 2010

(51) Int. Cl.
  *B60H 1/00* (2006.01)
  *A47B 83/00* (2006.01)
  *B60K 11/06* (2006.01)
  *B60P 3/14* (2006.01)

(52) U.S. Cl. .............. 454/108; 312/237; 296/190.09; 296/24.32

(58) Field of Classification Search .............. 454/103, 454/108, 193, 254; 312/236, 237; 296/24.03, 296/24.32, 190.09, 37.1; 224/404; 415/44
  See application file for complete search history.

(56) References Cited

U.S. PATENT DOCUMENTS

| | | | | |
|---|---|---|---|---|
| 3,836,220 A * | 9/1974 | Ishammar | ............. | 312/236 |
| 4,048,911 A * | 9/1977 | Petersen | ............. | 454/136 |
| 4,506,655 A * | 3/1985 | Kuechler | ............. | 126/299 D |
| 4,633,767 A * | 1/1987 | Sain | ............. | 454/92 |
| 6,277,176 B1 * | 8/2001 | Tang et al. | ............. | 95/270 |
| 6,718,784 B1 * | 4/2004 | Bushnell | ............. | 62/244 |
| 6,941,654 B1 * | 9/2005 | Sears | ............. | 29/897.2 |
| 7,784,885 B2 * | 8/2010 | Steiger et al. | ............. | 312/107 |
| 7,909,685 B2 * | 3/2011 | Heim et al. | ............. | 454/184 |
| 7,925,390 B2 * | 4/2011 | Jingu et al. | ............. | 700/301 |
| 2008/0076343 A1 * | 3/2008 | Pyers | ............. | 454/141 |
| 2009/0220360 A1 * | 9/2009 | Zhang et al. | ............. | 417/354 |

* cited by examiner

*Primary Examiner* — Steven B McAllister
*Assistant Examiner* — Frances H Kamps
(74) *Attorney, Agent, or Firm* — Dennis L. Thomte; Thomte Patent Law Office LLC (57) ABSTRACT

A pressurized storage system for a service truck body or the like which pressurizes the storage compartment thereof by means of an air blower located above the storage compartment.

3 Claims, 6 Drawing Sheets

SERVICE TRUCK BODY PRESSURIZED STORAGE SYSTEM

BACKGROUND OF THE INVENTION

1. Field of the Invention

This invention relates to a pressurized storage system for a service truck body or the like and more particularly to a pressurized storage system for a service truck body or the like which pressurizes the storage compartment or compartments of the truck body to prevent the entry of contaminants such as dust, dirt, rain or snow into the storage compartment or compartments. Even more particularly, this invention relates to a pressurized storage system for a service truck body or the like which pressurizes the storage compartment or compartments of the truck body but does not occupy space within the truck body compartment or compartments.

2. Description of the Related Art

Service truck bodies are mounted on a vehicle frame and include one or more storage compartments which are normally closed by a closure door or the like. While the vehicle is in motion, the flexure of the vehicle frame causes torsion and deformation in the truck body structure. The deformation of the truck body structure allows gaps to exist at the edge of the compartment closure doors thereby creating paths for contaminants to enter the truck body compartment.

Maintainer Corporation of Iowa, in approximately 1980, was the first to develop a pressurized storage system for service truck bodies which pressurized the storage compartment or compartments thereof to prevent contaminants from entering the truck body compartment or compartments. In the service truck body industry, the standard prior art solution to prevent contaminants from entering the storage compartment of the truck body compartment was to place a single inlet centrifugal blower inside the truck body compartment to pull outside air into the truck body compartment through an externally mounted air filter to maintain a static pressure in the truck body compartment to prevent the entry of contaminants from outside the truck. Although the pressurized storage systems of the prior art did satisfactorily function to prevent contaminants from entering the storage compartment or compartments, certain disadvantages or issues were presented by the prior art system. First, by having the single inlet centrifugal blower positioned inside the truck body compartment, the same required additional guarding for operator safety since the operator could come into contact with the impeller of the blower. Second, the blower location inside the storage compartment took up valuable storage space. Third, maintenance of the system requires maintenance in two separate locations, that is, inside the truck body compartment, and externally on the top of the truck body compartment. Fourth, while standard truck body warranties are up to 10,000 hours, the standard blowers for the pressurized system are only rated at 1,000 hours of life.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A service truck body pressurized storage system is described for use for a service truck body having one or more selectively closable body compartments provided thereon which have an upper wall. The upper wall of the body compartment has an air inlet opening formed therein. An air blower including a dual air inlet and a single air discharge is positioned on the upper wall exteriorly of the body compartment so that the air being discharged therefrom is in communication with the air inlet opening in the upper wall of the body compartment so that the blower will force air into the body compartment. An air filter is associated with the air blower which filters the air being drawn into the air inlets of the blower. In the preferred embodiment, the air filter at least partially extends around the air blower. In the preferred embodiment, a filter cover extends at least partially around the air filter. In the preferred embodiment, the air blower is a dual inlet centrifugal blower with a single outlet.

The advantage of mounting the air blower exteriorly of the body compartment frees up additional storage space within the body compartment and reduces cost of maintenance.

It is thus an objective of the present invention to provide a novel service truck body pressurized storage system.

It is a further object of the present invention to provide a novel service truck body pressurized storage system which utilizes components that uniquely combine multiple functions.

It is a further object of the present invention to provide a novel service truck body pressurized storage system which uniquely pushes the airflow into the truck body compartment from the exterior thereof rather than pulling the airflow into the truck body compartment interior.

It is a further object of the present invention to provide a novel service truck body pressurized storage system which uniquely maximizes the internal volume of the truck body compartment.

It is a further object of the present invention to provide a novel service truck body pressurized storage system which uniquely removes dangerous components from the interior of the truck body compartment.

It is a further object of the present invention to provide a novel service truck body pressurized storage system which uniquely combines air inlet and guarding into a single feature.

It is a further object of the present invention to provide a novel service truck body pressurized storage system which utilizes a circular profile air duct that uniquely combines functions such as (1) forming the central pathway for the air flow while; (2) also providing the still air box function required by a dual inlet centrifugal blower to function properly; (3) protecting internal components from exposure to outdoor elements; (4) providing a vertical support for the low profile tubular air filter to be clamped to; and (5) providing the air filter cover sufficient height to prevent water from being suctioned into the filter.

It is a further object of the present invention to provide a novel service truck body pressurized storage system which utilizes a blower-hold-down/air-filter-locator weldment that uniquely combines functions such as (1) positioning and securing the dual inlet centrifugal blower; and (2) axially aligning the low profile tubular air filter and air filter cover with the circular profile air ducts and the air inlet holes in the ceiling of the truck body compartment.

It is a further object of the present invention to provide a novel service truck body pressurized storage system which uniquely allows that performing maintenance on any of the serviceable components results in inspection of all serviceable components simultaneously.

It is a further object of the present invention to provide a novel service truck body pressurized storage system which uniquely allows the assembly to be located such that the circular profile air duct thereof can be tangent to any vertical or horizontal wall of the truck body compartment with the low profile tubular air filter and air filter cover overhanging the edge of the wall to allow a greater range of mounting locations.

These and other objects and advantages of the present invention will become clearer in light of the following detailed description of an illustrative embodiment of this invention described in connection with the drawings.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

All figures are drawn for ease of explanation of the basic teachings of the present invention only; the extensions of the figures with respect to number, position, relationship and dimensions of the parts to form the preferred embodiment will be explained or will be within the skill of the art after following teachings of the present invention have been read and understood. Further, the exact dimensions and dimensional proportions to conform to specific force, weight, strength and similar requirements will likewise be within the skill of the art after following teachings of the present invention have been read and understood.

Where used in the various figures of the drawings, the same numerals designate the same or similar parts. Furthermore, when the terms, "axial", "radial", "first", "second", "side", "end", "inner" "outer", "inside", "outside", "above", "forward", "rearward", "top", "upper", "lower", "horizontal", "vertical", "front", "rear" and similar terms are used herein, it should be understood that these terms have reference only to the structure shown in the drawings as it would appear to a person viewing the drawing and are utilized only to facilitate describing the preferred embodiment.

Description of the Preferred Embodiment

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 6:
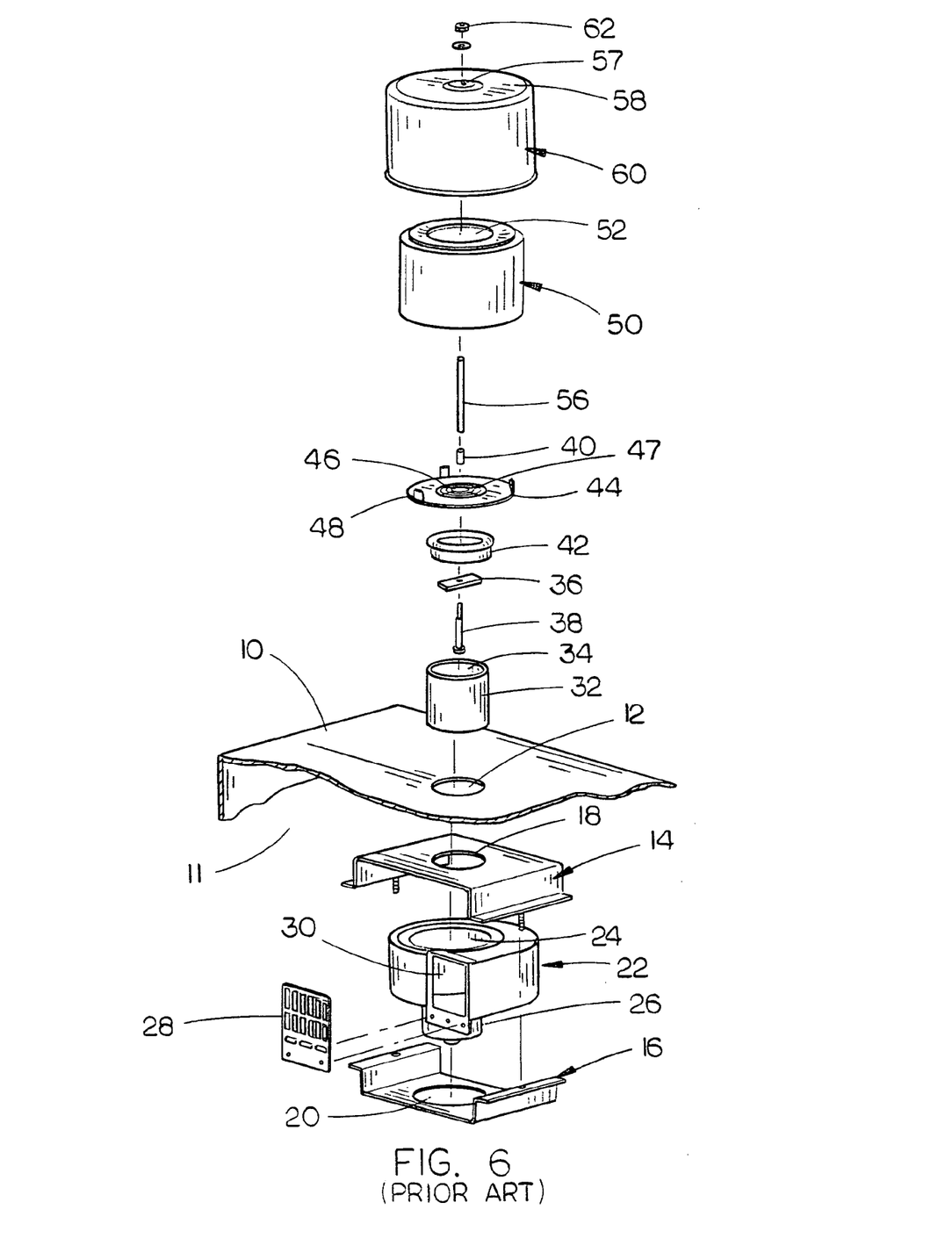
FIG. 6 is an exploded perspective view illustrating a prior art service truck body pressurized storage system.

With respect to the prior art service truck body pressurized storage system, the same is illustrated in FIG. 6. In FIG. 6, the numeral 10 refers to the ceiling upper wall or top wall of a truck body storage compartment 11 which has an opening 12 formed therein. A top mounting bracket 14 is welded to the inner surface of top wall 10. A bottom mounting bracket 16 is bolted to top mounting bracket 14 as seen in FIG. 6. Bracket 14 has an air inlet opening 18 formed therein which is aligned with opening 12. Bracket 16 has an opening 20 formed therein as also seen in FIG. 6. A centrifugal blower 22 is positioned between brackets 14 and 16 and is secured thereto so that its single air inlet 24 is aligned with opening 18 in bracket 14 and opening 12 in top wall 10 and so that the blower motor 26 is partially received in opening 20 of bracket 16. A perforated finger guard 28 is positioned over the blower exhaust opening 30 for safety of the operator.

A metal cylindrical air duct 32 is secured to the upper surface of top wall 10 by welding or the like so that the central opening 34 thereof is aligned with opening 12 in top wall 10. A horizontally extending flat bar 36 is welded to the interior wall surface of air duct 32 and extends thereacross approximately mid-way between the upper and lower ends of the air duct 32.

A round bolt 38 is welded to bar 36 and extends upwardly therefrom with the threaded upper end of the bolt 38 being positioned above the upper end of air duct 32 so that a coupler nut 40 may be threadably mounted thereon. Circular or ring-shaped weather stripping 42 is mounted on the upper end of air duct 32 to provide an air pressure seal between the air duct 32 and the next component in the assembly.

A horizontally disposed circular plate 44 is positioned on the weather stripping 42 which has a central opening 46 formed therein which is aligned with the air duct 32, opening 12, opening 18 and air inlet 24 of blower 22. Opening 46 in plate 44 has a perforated web extending thereover with has an opening 47 formed therein to permit bolt 38 to extend upwardly therethrough. A plurality of tabs 48 extend upwardly from the periphery of plate 44. A tubular shaped air filter 50 is positioned on plate 44 between the tabs 48 so that the central opening 52 of air filter 50 is aligned with opening 46 in plate 44. The elongated, internally threaded coupler nut 40 has its lower end threadably mounted on the threaded upper end of rod 38. Nut 40 is tightened on rod 38 so that the plate 44 is clamped onto the weather stripping 42. The coupler nut 40 is tightened until the weather stripping deforms sufficiently to provide an air pressure seal between the air duct 32 and the plate 44.

The lower end of a threaded rod 56 is threaded into the upper end of coupler nut 40 and extends upwardly therefrom through the center of air filter 50 and through the opening 57 in the upper wall 58 of filter cover 60 which extends over filter 50. Nut 62 is threaded onto the upper end of rod 56 to maintain cover 60 in place. When assembled, the lower end of cover 60 is spaced above the upper surface of top wall 10 of the body compartment so that intake air may enter the interior of cover 60 and pass through the side walls of air filter 50 into the central opening 52, thence downwardly through the web covered opening 46, through weather stripping 42, air duct 32, opening 12, opening 18 and into the air inlet 24 of blower 22 for discharge from opening 30, and through guard 28 into the interior of the body compartment 11. The fact that the brackets 14 and 16 and blower 22 are located within the body compartment takes up valuable space within the body compartment. Further, if maintenance must be performed on the system, the operator must perform the maintenance both within the body compartment and exteriorly of the body compartment.

Figure 1:
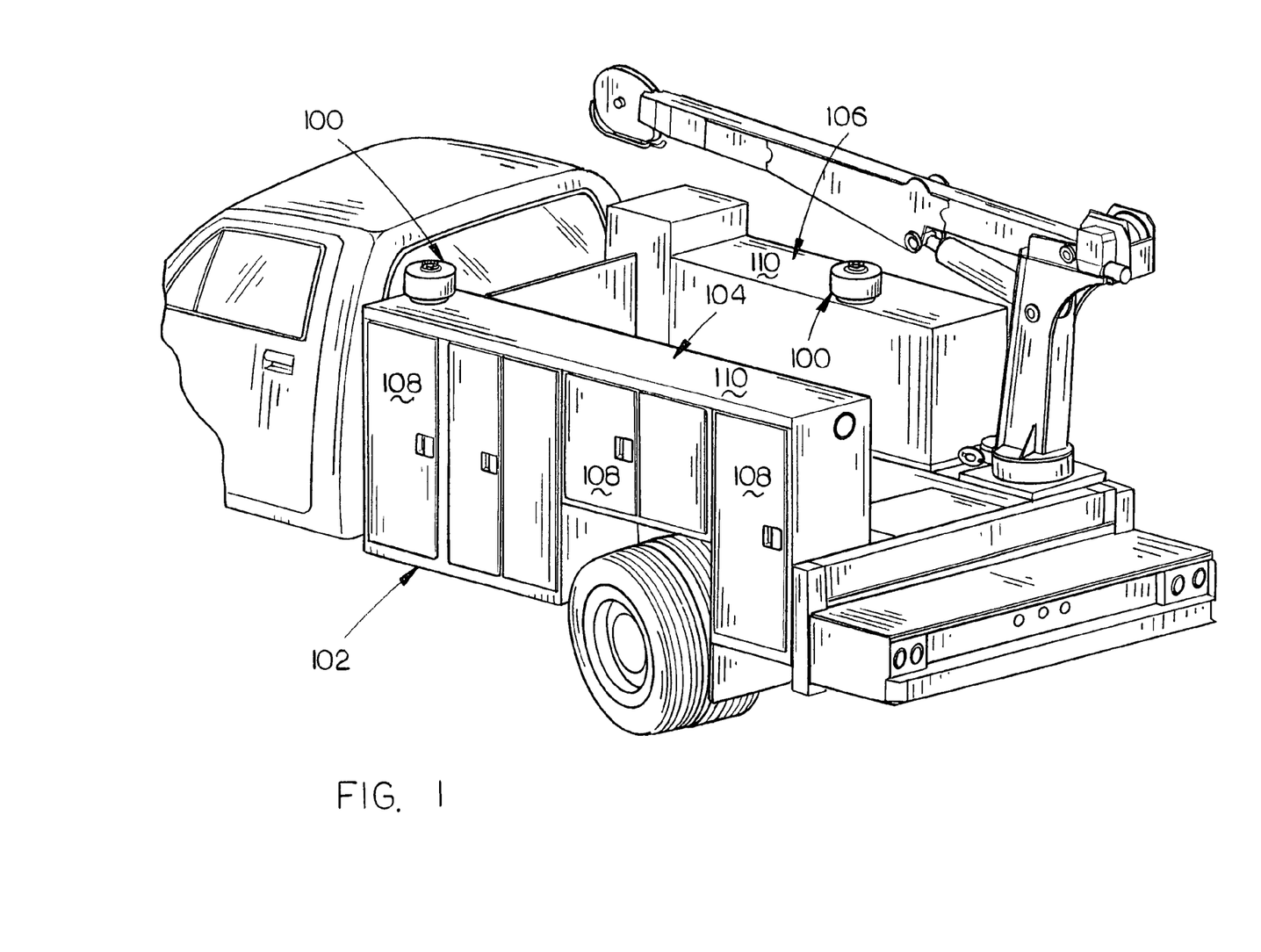
FIG. 1 is a rear perspective view of a service truck body having the pressurized system of this invention incorporated therein.
Figure 2:
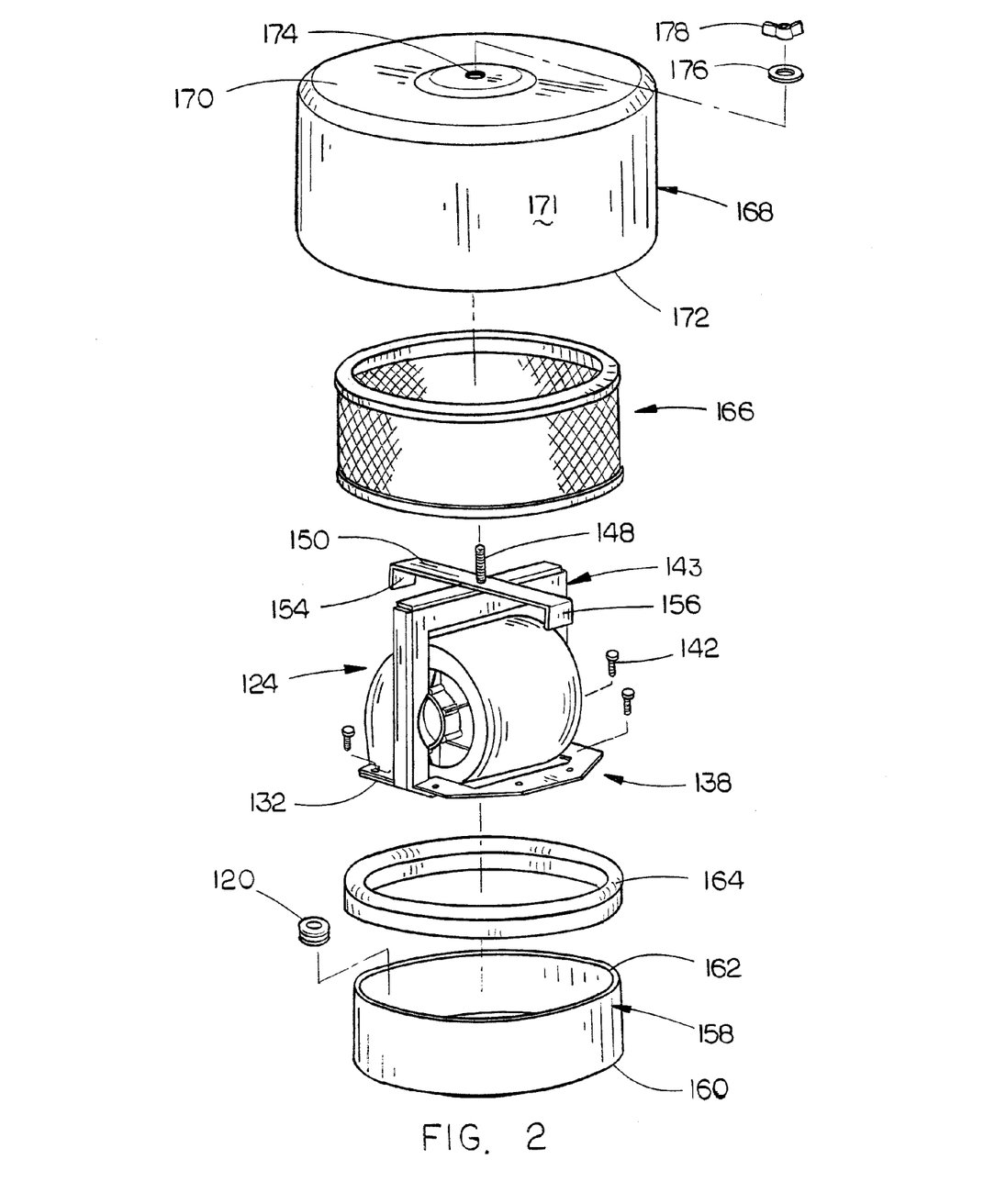
FIG. 2 is an exploded perspective view of a portion of the means for pressurizing a body compartment of the service truck body.

The service truck body pressurized storage system according to the preferred embodiment of the present invention is illustrated in FIGS. 1-5, which is generally designated by the reference numeral 100. Generally, system 100 will be suitable for use with various types of truck bodies such as service truck bodies, crane truck bodies, lube truck bodies and utility truck bodies, etc. FIG. 1 illustrates the truck body as being a service truck body 102 including two separate truck body compartments 104 and 106. Each of the truck body compartments 104 and 106 have closable doors 108 associated therewith. The pressurized storage system 100 is utilized with each of the compartments 104 and 106. A system 100 is mounted on the upper wall or ceiling 110 of each of the compartments 104 and 106. Since the systems 100 on the compartments 104 and 106 are identical, only a single system 100 will be described.

In the preferred embodiment of the invention, the upper wall or ceiling 110 of the truck body compartment 104 has a plurality of openings in the form of spaced-apart slots or slits 112 formed therein to permit a blower to force air into the interior of the compartment 104 as will be described in more detail hereinafter. The openings 112 are sufficiently small to prevent operator injury while the operator is working inside the truck body compartment 104 which negates the need for additional guarding inside the compartment. A plurality of weld nuts 114 are welded to the inside surface of upper wall 110 so as to register with the openings or holes 116 formed in upper wall 110. Further, a larger opening 118 is formed in upper wall 110 which has a grommet 120 positioned therein which is adapted to permit electrical wires 122 to extend upwardly therethrough from the electrical system of the truck to the motor on the blower as will be described in more detail hereinafter.

The numeral 124 refers to a dual inlet/single outlet centrifugal blower including a housing 126 which has a pair of oppositely disposed air inlets 128 at the opposite sides thereof so that air may be drawn inwardly therethrough for contact with the impeller 130 of the blower 124. Blower 124 is driven by a conventional 12-volt DC motor. Electrical wires 122 connect the motor of the blower 124 with the 12-volt electrical system of the truck. Housing 126 of blower 124 has a mounting flange mounted at the lower ends of the sides thereof. Only a single mounting flange is illustrated in the drawings and is represented by the reference numeral 132. The flanges 132 have mounting holes 134 formed therein which are adapted to register with a pair of the holes 116 in the upper wall 110. Blower 124 has a single discharge opening at its lower end which is referred to generally by the reference numeral 136.

The numeral 138 refers to a blower-hold-down/air-filter-locator weldment which is placed around and over the blower 124 such that the holes 140 formed in the lower end of the weldment 138 align axially with the holes 134 in the blower 124 flanges 132 and the holes 116 in the upper wall 110 as well as the weld nuts 114 attached to the inside surface of the upper wall 110 of the truck body compartment 104. Screws 142 fasten the blower 124 to the upper wall 110.

Figure 5:
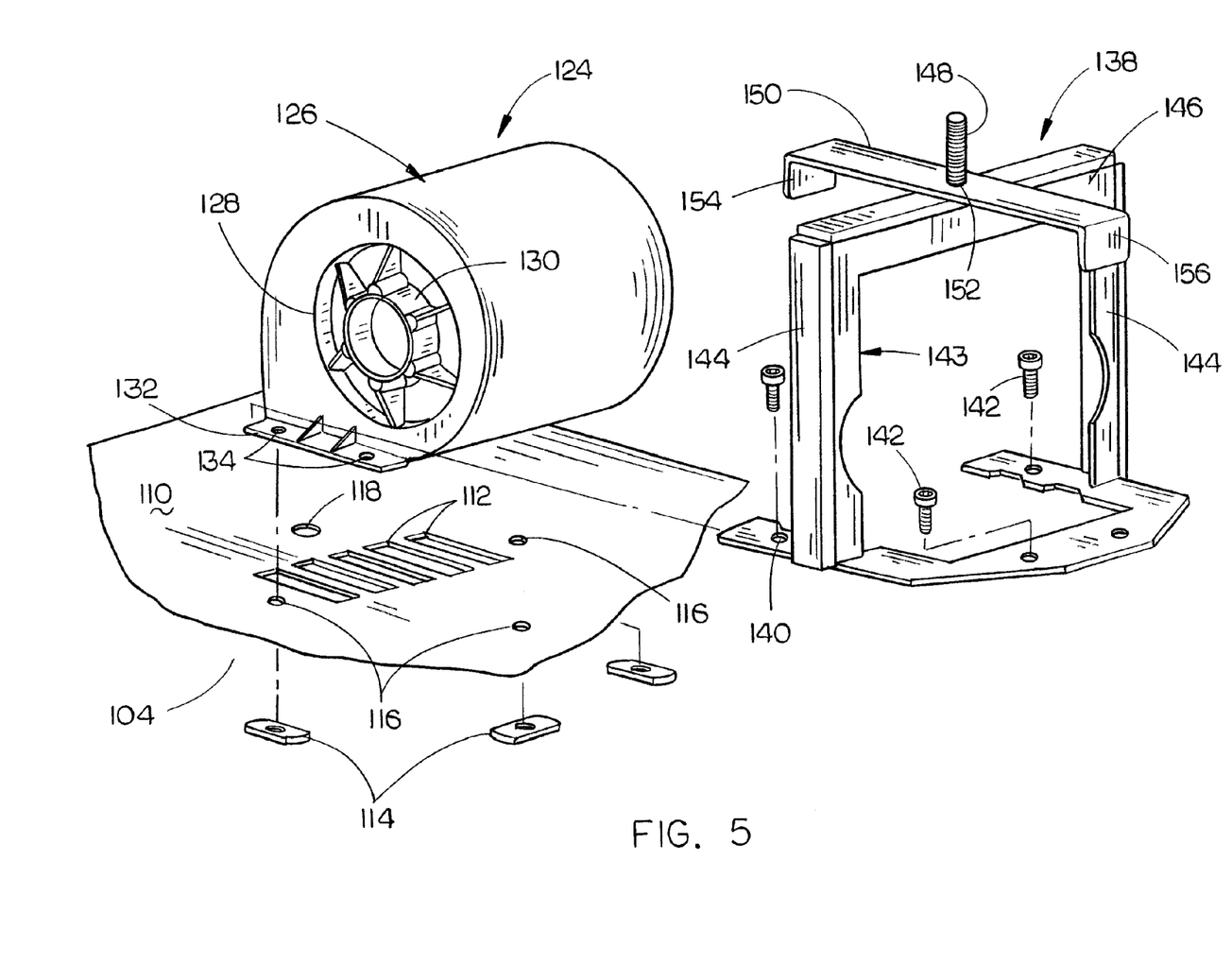
FIG. 5 is an exploded perspective view illustrating components of the system of this invention.

Weldment 138 includes a generally inverted U-shaped member 143 including upstanding side portions 144 and 144' and upper end portion 146 extending between the upper ends of the side portions 144 and 144'. The U-shaped member 143 has a generally L-shaped cross section. Member 143 straddles the centrifugal blower 124 seen in the drawings. A threaded rod or bolt 148 is welded to the upper end portion 146 and extends upwardly therefrom as illustrated in FIG. 5. The numeral 150 refers to a flat bar having an opening 152 which receives the rod 148 to permit the bar 150 to be oriented perpendicularly to the upper end portion 146 of member 143 as seen in FIG. 5. Bar 150 has downwardly extending end portions 154 and 156 at its opposite ends.

The numeral 158 refers to a ring-shaped air duct having a lower end 160 and an upper end 162. The lower end 160 of air duct 158 is welded to the upper surface of upper wall 110 so as to extend around the blower 126 and the weldment 138. The air duct 158 has a sufficient diameter so as to circumscribe the dual inlet centrifugal blower 124, the blower-hold-down/air-filter-locator weldment 138, grommet 120, openings 112 and holes 116. The height of the air duct 158 is approximately equal to one-half the height of the inlet openings of the blower 124. A weather stripping material 164 is secured to the upper end of air duct 158 and extends therearound as seen in the drawings.

A low-profile tubular air filter 166 is inserted over the weldment 138 which axially aligns the filter 166. The low-profile tubular air filter 166 is inserted downwardly until it rests on the weather stripping 164. An air filter cover 168 is provided and includes an upper wall 170 and a downwardly extending cylindrical wall portion 171 having a lower end 172. Upper wall 170 includes an opening 174 formed therein which is adapted to receive the rod 148. The bottom of cover 168 receives the air filter 166. The upper end of filter 166 sealably engages the underside of upper wall 170 of cover 168. Washer 176 and wing nut 178 are then threadably mounted onto the upper end of the rod 148 to maintain the filter in place. The end portions 154 and 156 of the bar 150 centrally position the air filter 166.

Figure 3:
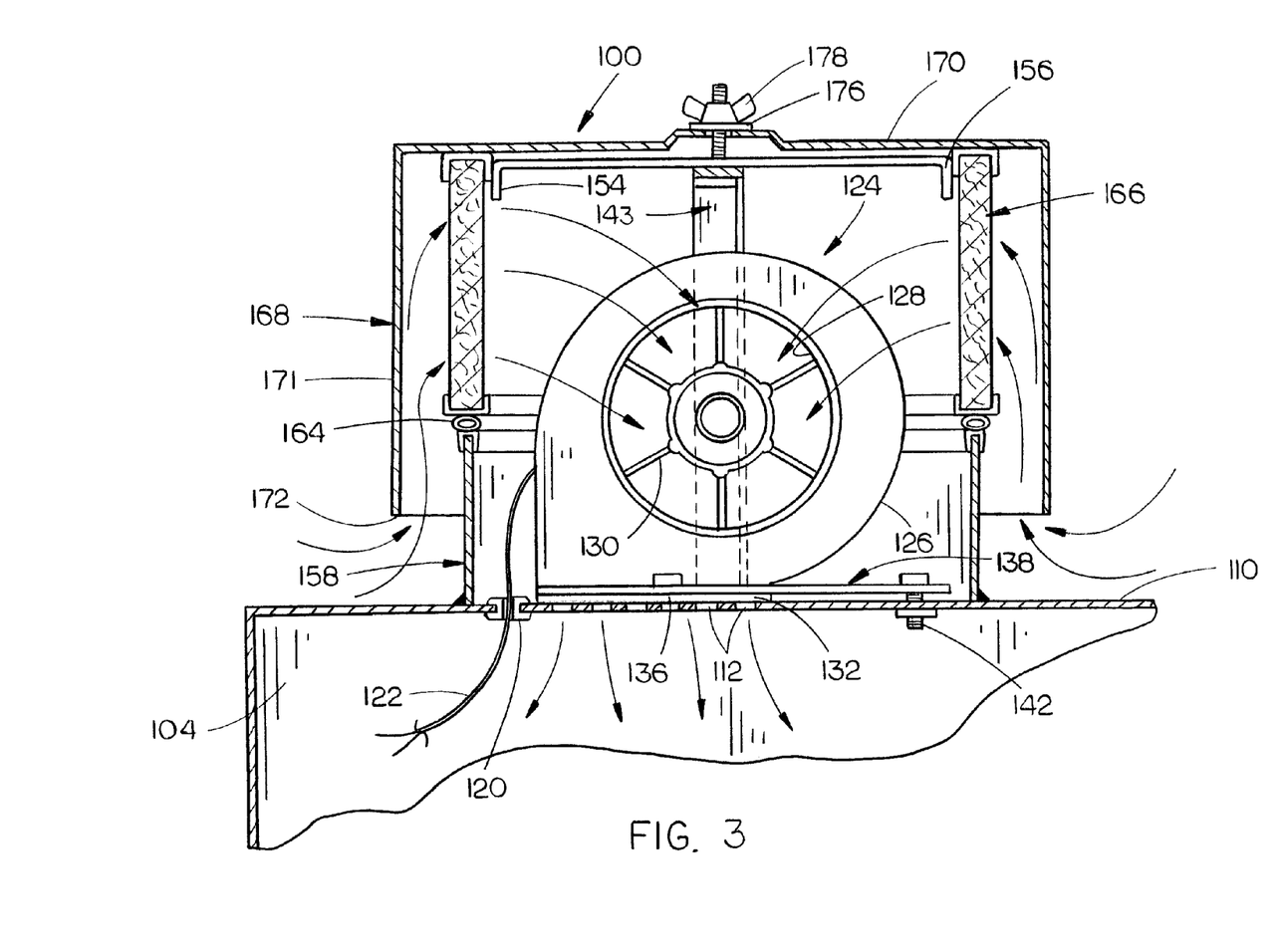
FIG. 3 is a sectional view illustrating the pressurized storage system of this invention.
Figure 4:
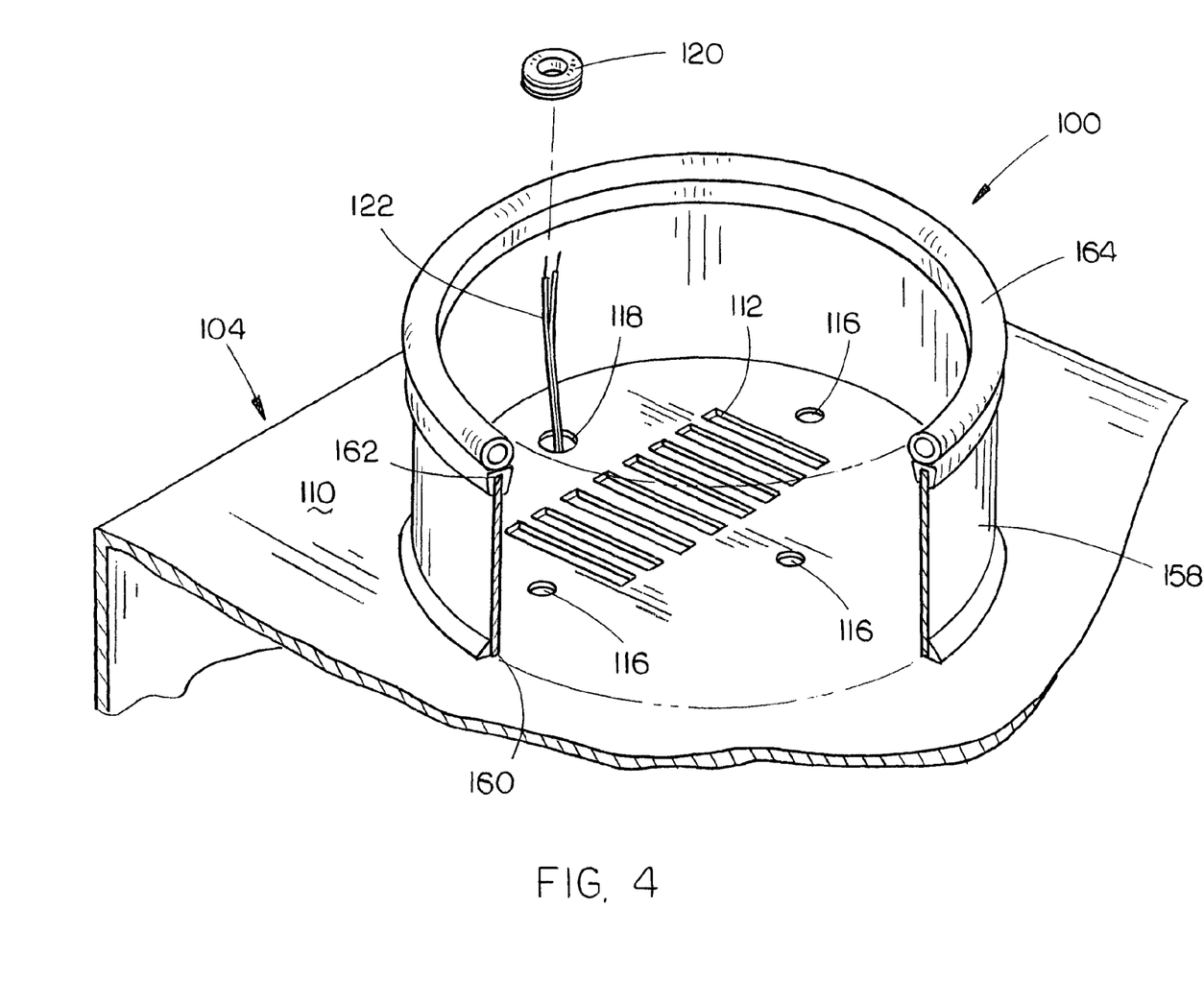
FIG. 4 is a partial perspective view illustrating a portion of the pressurized storage system of this invention.

It should be noted that the weldment 138 performs multiple functions. Weldment 138 clamps the blower 124 to the upper wall 110 of the truck body compartment 104 and locates the low-profile air filter 166 as well as locating the air filter cover 168 with the circular profile air duct 158. When the wing nut 178 is tightened, the weather stripping 164 is compressed to form a tight seal between the upper end of the air duct 158 and the lower end of the air filter 166. When the system 100 is fully assembled, as illustrated in FIG. 3, the lower end 172 of cover 168 is positioned above the upper wall 110 of compartment 104, as illustrated in FIG. 3, so that ambient air may enter the interior of the cover 168 and pass through the air filter 166 and into the intake ends of the blower 124 for exhausting therefrom into the interior of the compartment 104.

Thus, it can be seen that a novel truck body pressurized storage system which mounts the blower thereof above the truck body compartment to free up space within the truck body compartment which would normally house the air blower of the prior art. Further, it can be seen that having the system of this invention mounted on top of the truck body compartment permits maintenance thereof to be performed in a single location. It can also be seen that the system of this invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. In combination:
a truck body having a selectively closable body compartment with an upper wall;
said upper wall having an air inlet opening formed therein;
an air blower including an air inlet and an air discharge;
said air blower being positioned on said upper wall exteriorly of said body compartment so that said air discharge thereof is in communication with said air inlet opening in said upper wall so that said blower may force air into said body compartment;

an air filter associated with said air blower which filters the air being drawn into said air inlet;

said air blower including a blower housing;

said air blower including a horizontally disposed impeller, having opposite ends, rotatably mounted in said blower housing about a horizontal axis;

said blower housing having an air inlet formed therein at each end of said impeller;

said blower housing including a lower end;

said air discharge of said blower being positioned at said lower end thereof; and a cylindrical air duct, having upper and lower ends, extending around said air blower in a spaced relationship with respect thereto;

said lower end of said air duct being in engagement with said upper wall of said storage compartment and extending upwardly therefrom.

2. The combination of claim 1 wherein said air inlets of said air blower have upper and lower ends and wherein said upper end of said air duct is disposed between said upper and lower ends of said air inlets of said air blower.

3. The combination of claim 1 wherein said air filter is ring-shaped and is positioned on said upper end of said air duct and wherein a filter cover extends around said air filter and extends downwardly to a location above said upper wall of said storage compartment so that ambient may be drawn into said filter cover and through said air filter, into the inlets of said blower, thence downwardly through said air discharge of said blower and then downwardly through said air inlet opening in said upper wall into said body compartment.

\* \* \* \* \*